United States Patent
Berka et al.

(10) Patent No.: US 9,753,477 B2
(45) Date of Patent: Sep. 5, 2017

(54) LOAD FORECASTING FOR RESIDENTIAL SECTOR DEMAND RESPONSE

(71) Applicant: Honeywell International Inc., Morristown, NJ (US)

(72) Inventors: Jan Berka, Prague (CZ); Jiri Rojicek, Prague (CZ)

(73) Assignee: Honeywell International Inc., Morris Plains, NJ (US)

(*) Notice: Subject to any disclaimer, the term of this patent is extended or adjusted under 35 U.S.C. 154(b) by 456 days.

(21) Appl. No.: 14/486,294

(22) Filed: Sep. 15, 2014

(65) Prior Publication Data

US 2016/0077538 A1    Mar. 17, 2016

(51) Int. Cl.
| | | |
|---|---|---|
| G05B 13/04 | (2006.01) | |
| G05F 1/66 | (2006.01) | |
| G06Q 50/06 | (2012.01) | |
| H02J 3/00 | (2006.01) | |

(52) U.S. Cl.
CPC ............ *G05F 1/66* (2013.01); *G06Q 50/06* (2013.01); *H02J 3/00* (2013.01); *H02J 2003/003* (2013.01); *H02J 2003/007* (2013.01)

(58) Field of Classification Search
CPC ....... G05F 1/66; G06Q 50/06; H02J 2003/003
USPC ........................................................ 700/291
See application file for complete search history.

(56) References Cited

U.S. PATENT DOCUMENTS

| | | | |
|---|---|---|---|
| 2012/0136496 A1* | 5/2012 | Black ..................... | H02J 3/14 700/291 |
| 2015/0213564 A1* | 7/2015 | Ishida ................ | G06Q 30/0204 705/7.33 |

* cited by examiner

*Primary Examiner* — Kenneth M Lo
*Assistant Examiner* — Yuhui R Pan
(74) *Attorney, Agent, or Firm* — Schwegman Lundberg & Woessner, P.A.

(57) ABSTRACT

A method includes obtaining energy consumption information representative of energy consumption behaviors of multiple customers, grouping the multiple customers into multiple different clusters based on the consumption behaviors of the multiple customers, and generating an energy consumption model for each different cluster to enable forecasting of energy demand of the multiple customers.

18 Claims, 8 Drawing Sheets

LOAD FORECASTING FOR RESIDENTIAL SECTOR DEMAND RESPONSE

BACKGROUND

In Demand Response (DR) programs, utility companies experience strong need for accurate and reasonably fast predictions of customer energy loads in order to economically choose Demand Response signals scheduling and targeting, where a residential sector is an important target. Unlike commercial buildings, the residential sector contains a large number of customers such as individuals and families that typically are relatively small energy consumers. To deal with each small energy consuming customer individually is difficult and inefficient. The process for commercial and industrial (C&I) sector forecasting is not suitable for the residential sector, because the number of C&I customers is substantially lower and the energy demand of individual C&I customers is higher in orders of magnitude.

Modeling the energy demand of individual residential customers would lead to scalability issues, being computationally expensive. The accuracy of the predictions could be also quite low because of high variance of residential customer energy usage.

SUMMARY

A method includes obtaining energy consumption information representative of energy consumption behaviors of multiple customers, grouping the multiple customers into multiple different clusters based on the consumption behaviors of the multiple customers, and generating an energy consumption model for each different cluster to enable forecasting of energy demand of the multiple customers.

A further method includes forming multiple clusters of energy utilizing customers based on the customer behavior, identifying a model for each of the multiple clusters that predicts energy utilization of a typical customer in each of the multiple clusters responsive to a demand response event, and using the clusters and models to simulate multiple scenarios and predict energy utilization for each scenario in order to find a scenario that meets a desired energy load modification criteria.

A device includes a processor and a memory device coupled to the processor and having a program stored thereon for execution by the processor. When executing the program, the processor obtains energy consumption information representative of energy consumption behaviors of multiple customers, groups the multiple customers into multiple different clusters based on the consumption behaviors and other features of the multiple customers, and generates an energy consumption model for each different cluster to enable forecasting of energy demand of the multiple customers.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software or a combination of software and human implemented procedures in one embodiment. The software may consist of computer executable instructions stored on computer readable media or computer readable storage device such as one or more memory or other type of hardware based storage devices, either local or networked. Further, such functions correspond to modules, which are software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system. The article "a" or "an" means "one or more" unless explicitly limited to a single one.

Smart clustering of small energy consuming customers is performed and is dependent on customer behavior. Such clustering also results in a new workflow of the forecasting of energy needs.

In one embodiment, energy forecaster workflow is divided into three parts: clustering, model identification, and prediction. Clustering may be based on historical thermostat telemetry as well as weather information data analysis. Customers may be grouped into several clusters based on their HVAC usage and response to demand response (DR) events and other features generally referred to as energy consumption information. The examples of features used for clustering are: sum of electric heating/cooling status throughout the typical daily profile, number of opting out from a DR event divided by total DR events sent to the customer, geographical location etc. Further features may be added in further embodiments as more customer behaviors are observed. For example, expected family income in an area may be used as a feature. More than just one such feature may be used in various embodiments to form clusters.

An independent energy load model for each such cluster may be identified using the telemetry, weather and other historical data. To predict energy load of any given group of customers, the number of customers in each cluster may be found using known clustering results. Then, appropriate models are loaded and prediction may be made using these models. Results may be weighted by a number of customers in each cluster and summed together to provide total aggregated prediction for given group of customers. If any other information about customer is available (e.g. recent customers energy consumption), it also may be included in results weighting.

Clustering and model identification parts may be done offline and/or on demand, thus saving computation time of predictions. Also when new customers subscribe or unsubscribe to a DR program, there is no need to change the clustering or re-identify the models.

In some embodiments, a newly defined forecasting workflow separates model identification from predictions, enabling static models which can be trained offline and re-identified only when there is a substantial change in customer segment behavior. Clustering of residential customers may be based on their behavior and other features, which means easier and faster forecasting model identification based on less data and no action or fewer actions required when there is a change in the number of subscribed customers to the DR program.

Figure 1:
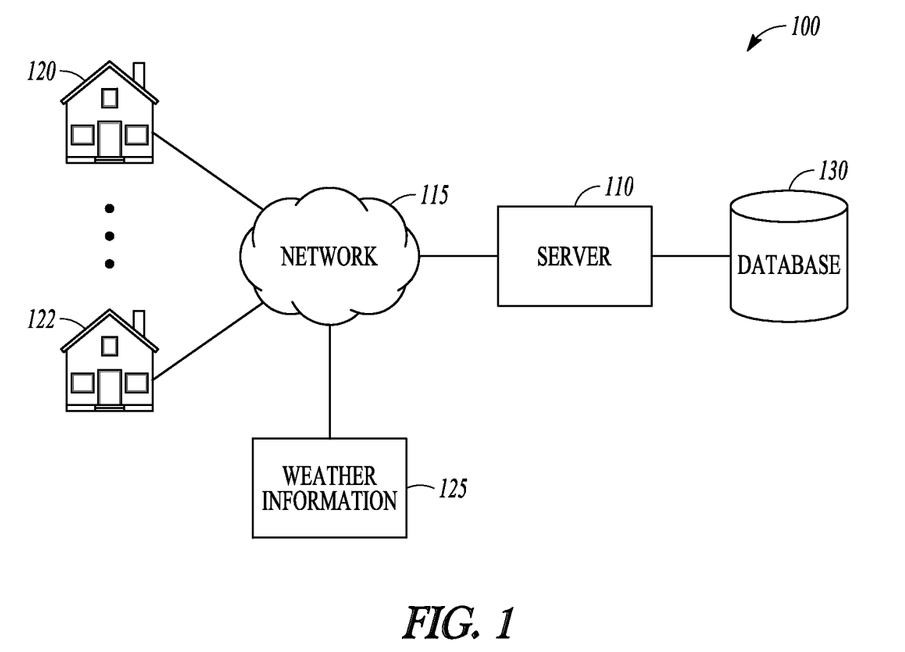
FIG. 1 is a block diagram of a forecasting infrastructure utilizing clustering of customers according to an example embodiment.

FIG. 1 is a block diagram of a forecasting infrastructure 100 that includes a server 110. The server 110 is coupled to a network 115 to receive telemetry information from multiple customers 120, 122 and data from other resources 125 coupled to the network 115. Customer 120, 122 are representative of a large number of customers in some embodiments, such as thousands to millions of customers. In one embodiment, the forecasting infrastructure 100 may be implemented via cloud resources. Telemetry from customer 120, 122 thermostats and weather information from resource 125 (actual and forecasts) may be stored in a server accessible database 130, together with information about customers, DR program details (event signals and their meaning) and clustering results (mapping of customer id to cluster id, which may be stored as character values in the database in the form of row number, customer ID, cluster ID). Energy load models for each cluster may be stored on the server 110.

Figure 2:
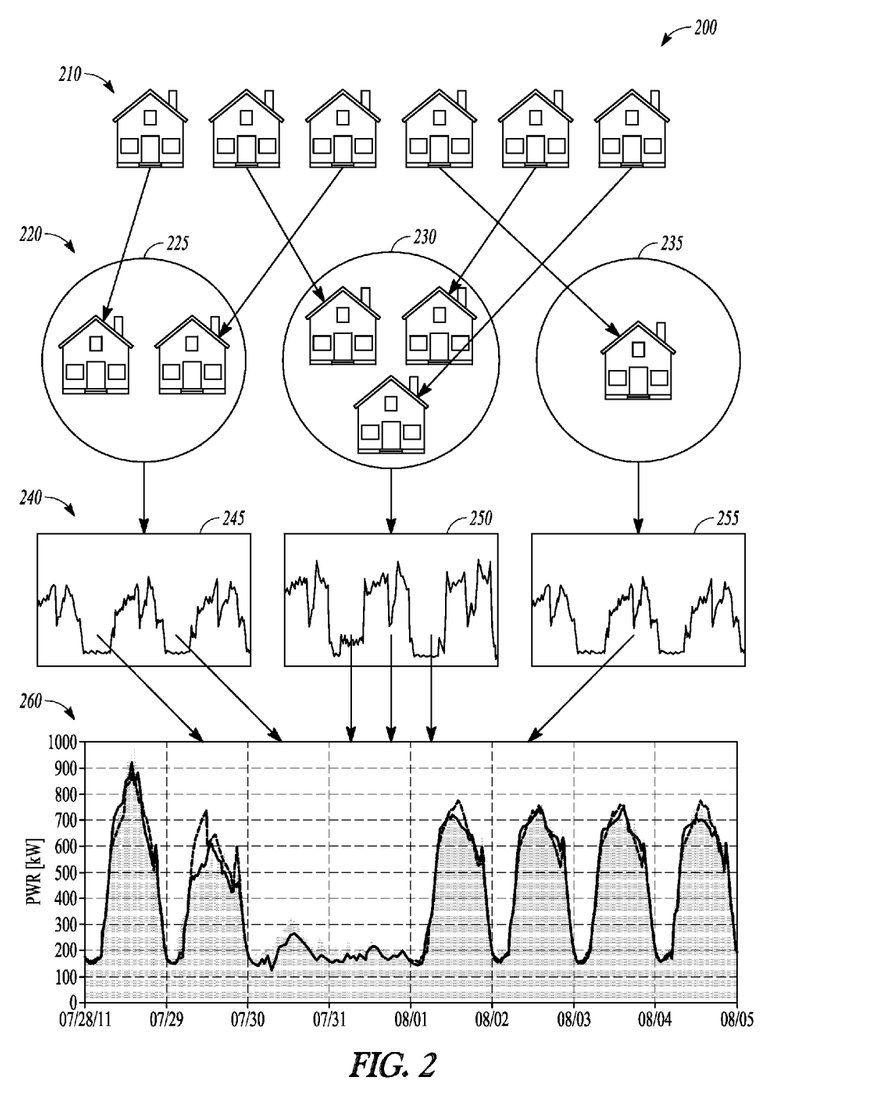
FIG. 2 is a block blow diagram illustrating clustering of customers according to an example embodiment.

FIG. 2 is a block flow diagram graphically illustrating a method 200 of forming clusters. At 210, information about multiple customers is collected. The information may include telemetry data representing responsiveness to DR events, thermostat setting, temperature, and weather information to name a few features. The information may be representative of customer behavior. Patterns may be observed in the information, and many customers may exhibit similar patterns. At 220, each customer is mapped to a pattern that is most representative of the customer's behavior. This mapping may be referred to as mapping to clusters. As seen at 220, two customers are mapped to a first cluster 225, three customers are mapped to a second cluster 230, and one customer is mapped to a third cluster 235. This example is highly simplified for clarity, and is representative of many more customers being mapped than shown. Further, the number of clusters may also vary significantly. Several examples are provided later in this description.

Once the customers are mapped to respective clusters, a model may be selected for each cluster as indicated at 240 for use in predicting a response of a typical customer to DR events. The model may be a complex formula based on many different inputs, such as time of day, responsiveness to DR events, weather forecasts, and other information that may affect a response of a typical customer in the cluster. Many different models may be used in various embodiments, ranging from a simple lookup table to artificial intelligence based models, such as neural networks. Using many of these models to calculate the predicted response of each individual customer would consume a significant number of resources, and would likely take much longer to perform, rendering the timing of any actions taken based on results too late.

Once the model for each cluster of multiple customers is run, providing the result for a typical customer at 245, 250, and 255 for each respective cluster 225, 230, 235, the results may be aggregated as indicated at 260 to provide an overall predicted consumption value. The result 245 for cluster 225 is multiplied by two, the number in cluster 225. The result 250 for cluster 230 is multiplied by three, and the result 255 for cluster 235 is multiplied by one. Once again, the number in each cluster will likely be much higher, leading to multipliers in the thousands in a typical scenario, if not more. While only three clusters are shown, in some embodiments, there may be many more. The number may be a function of the differences in behaviors versus the processing resource limitations. Too many clusters may utilize more processing resources than desired without significantly increasing accuracy. Too few a number of clusters may render the aggregated result inaccurate. Selecting the right number of cluster is thus dependent on how many different general behaviors are present in the customer set that result in a meaningful difference between clusters.

In some embodiments, clusters may be generated based on similarity of consumption patterns. In further embodiments, consumption patterns characteristics are only one of the features to be considered for customers segmentation. Other features may include the ability and/or willingness to react to DR signals, total daily consumption and other measures.

Figure 3:
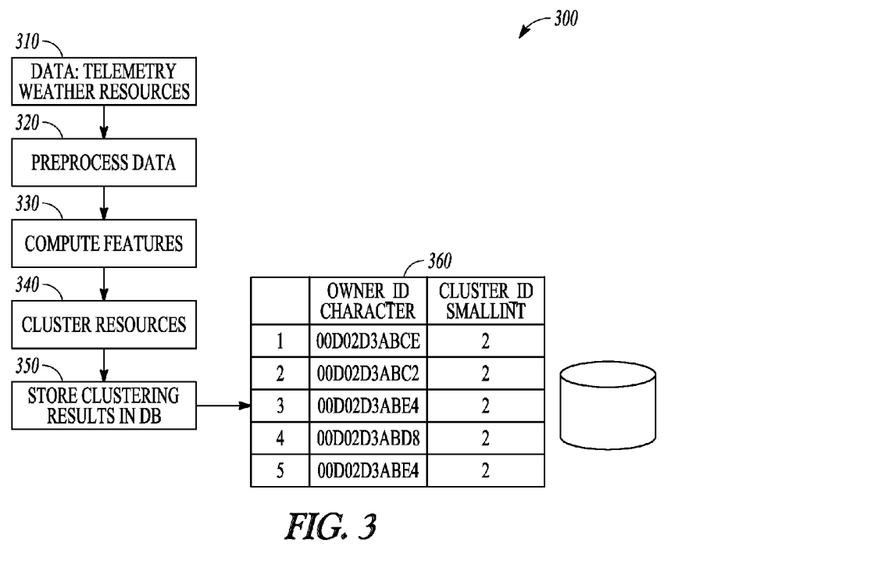
FIG. 3 is a block flow diagram illustrating clustering workflow according to an example embodiment.

FIG. 3 is a flowchart representation of clustering workflow 300. Data is received at 310 and may include telemetry from customer meters, weather correlated to customers, such as by geographical area, and information from other resources. The data is preprocessed at 320 to remove outliers. The data may also be aggregated to a desired sampling frequency. For instance, weather information may be received by the minute, but aggregated to the hour in order to reduce the amount of data needed to be processed later in the process. Daily energy utilization profiles may also be computed at 320. At 330, features are computed. Such features may include the sum of daily heating ventilation and air conditioning (HVAC) usage, whether a customer has opted out of DR along with the number of DR event signals sent. The features are used to form clusters and assign customers to the clusters. Pre-existing clusters may be used in some embodiments as indicated at 340, and various pattern matching algorithms may be used to assign customers to clusters in some embodiments. At 350, the clustering results are stored in database 360 utilizing customer id, also referred to as ownerid, and cluster id. One cluster is shown at 360, and given a cluster id of "2". There may be many more than two clusters in further embodiments.

Several examples of clusters based on consumption are shown in FIGS. 4, 5, 6, and 7. These clusters are simplified to show how different types of customers might have significantly different consumption patterns. In further embodiments, each of the clusters shown may be further broken into separate clusters for different customer behaviors, such as the frequency of response to DR events, as well as other behavioral components based on weather and other information.

Figure 4:
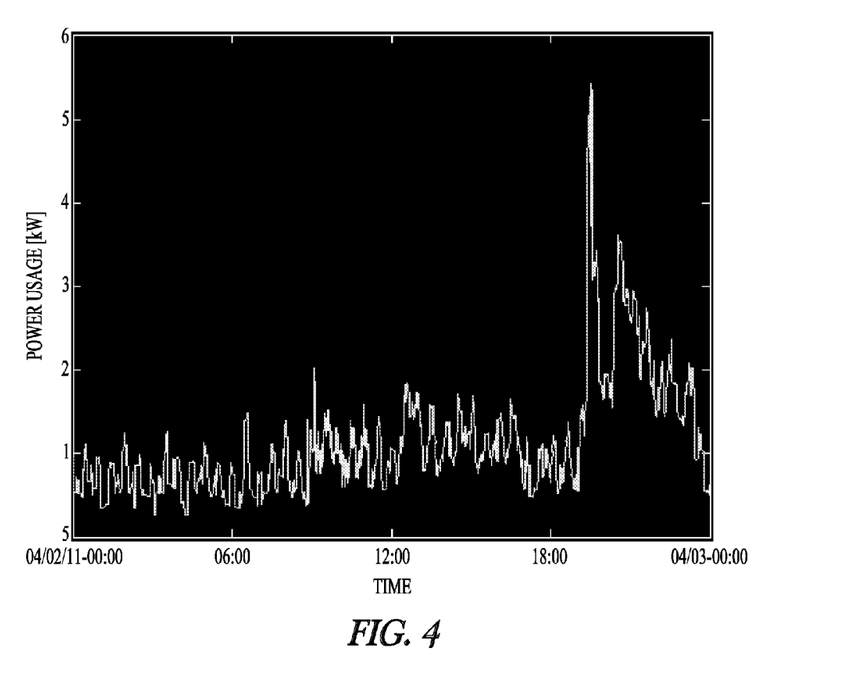
FIG. 4 is a graph illustrating an energy consumption pattern of a customer which may correspond to a cluster according to an example embodiment.

In FIG. 4, a line 400 illustrates a user consuming minimal power in kW during the day, with a notable peak in the evening, shortly after 6 PM. The line illustrates normal behavior, which may change responsive to a DR event signal requesting a decrease in air conditioning setpoint to reduce the peak consumption shortly after 6 PM. Some customers may not pay attention to such a DR event signal, and may be grouped in one cluster, while other customer exhibiting the same normal behavior may comply with the DR event signal and reduce their power consumption. Still other customers may have accepted installation of systems allowing a utility company to control the duty cycle of HVAC equipment. A separate cluster may be established for such customer, or they may be included in a cluster of customers that accept and implement a high percentage of DR event signals. Such customers may be placed in a different cluster. Other behaviors may result in still further splitting of customers into different clusters, such as responses to changing weather conditions, etc.

Figure 5:
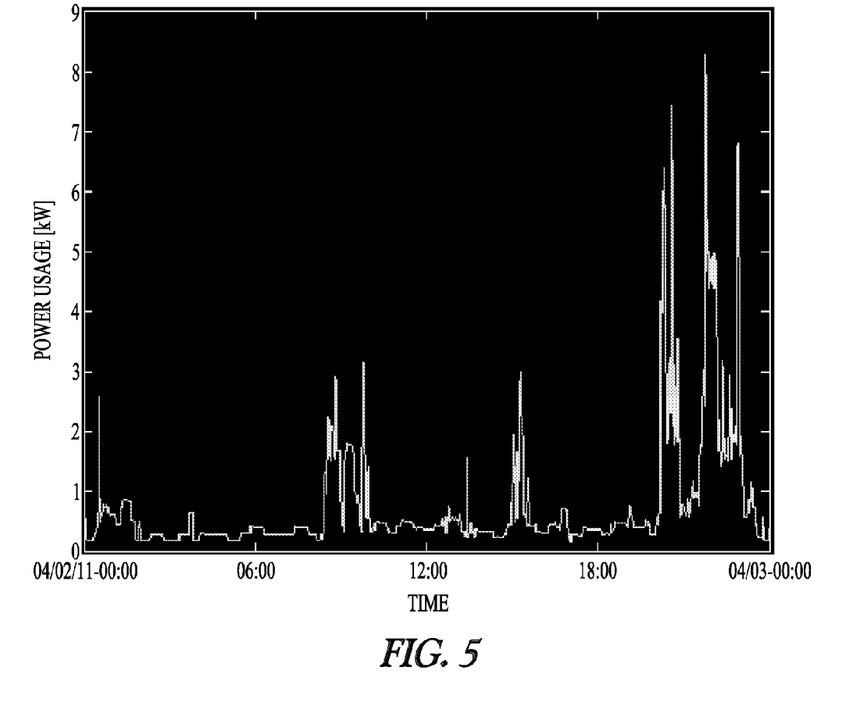
FIG. 5 is a graph illustrating an energy consumption pattern of a further customer which may correspond to a cluster according to an example embodiment.

In FIG. 5, a line 500 illustrates a customer with three significant peaks of energy consumption during the day, morning, noon, and evening.

Figure 6:
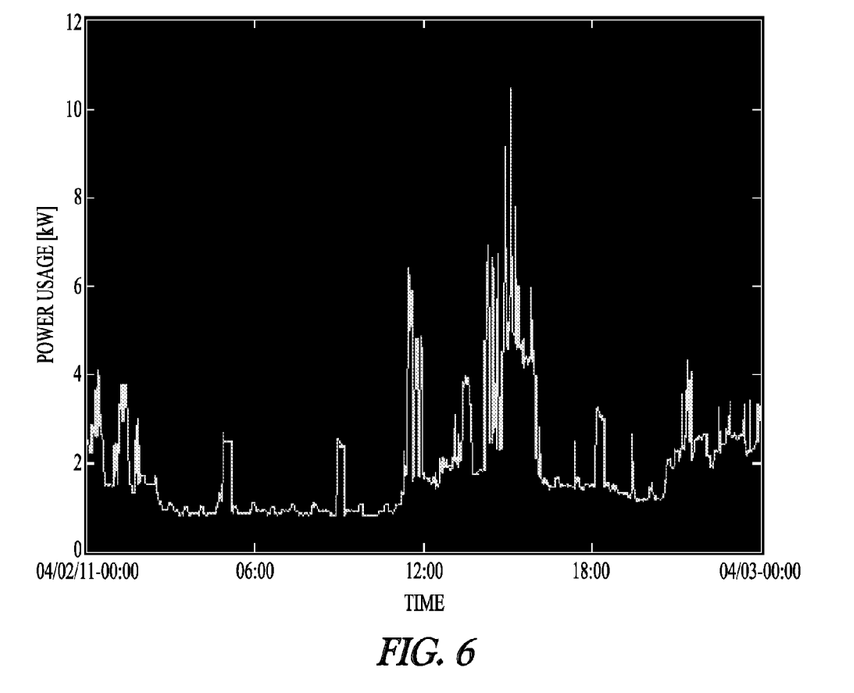
FIG. 6 is a graph illustrating an energy consumption pattern of a further customer which may correspond to a cluster according to an example embodiment.

In FIG. 6, a line 600 illustrates a customer with significant peaks of energy consumption during the afternoon and evening.

Figure 7:
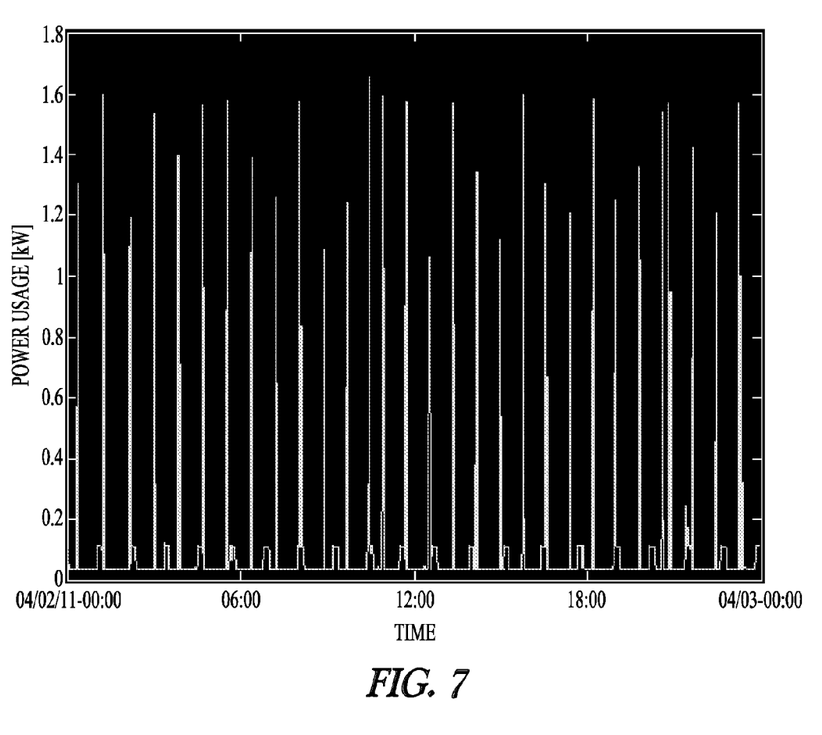
FIG. 7 is a graph illustrating an energy consumption pattern of a further customer which may correspond to a cluster according to an example embodiment.

In FIG. 7, a line 700 illustrates a customer with energy consumption cycles throughout the day with no significant trend.

In considering these four different usage patterns, a DR event signal sent with the intent to reduce peak consumption during the morning would not be effective if sent to a user exhibiting pattern 600, which shows minimal consumption during the morning. Similarly, such a signal would not be effective if sent to customers that routinely ignore such signals. Each of the patterns shown at lines 400, 500, 600, and 700 may represent one or more clusters to which customers may be assigned, based on further behavior indicating data, referred to as features. By mapping customers to such clusters, prediction of both normal usage, and usage responsive to DR event signals becomes easier to perform.

Figure 8:
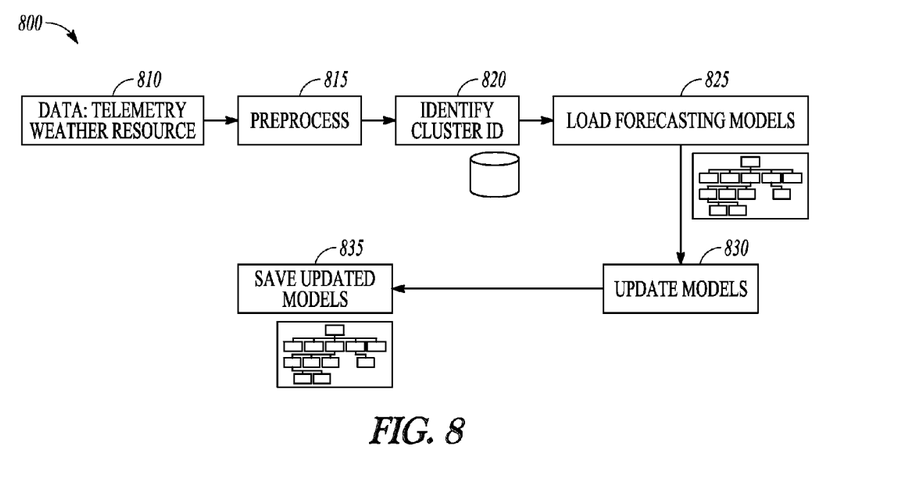
FIG. 8 is a block flow diagram illustrating forecaster training according to an example embodiment.

FIG. 8 is a block flow diagram of a method 800 for processing data received from customers off line at 810 to train a forecaster system. The data may include telemetry data, weather data, and data from other resources. In some embodiments, the data may relate to new customers, or to customers who change their behavior, such as by subscribing to a DR program. The data is preprocessed at 815 as previously described, and a cluster id is identified, associated with a customer id, and stored at 820 based on the customer behavior derived from the received data. Forecasting models for the clusters is loaded at 825 and may be updated at 830. Updating of a model may occur if the cluster was modified, if the data indicates a change in the behavior of typical members of the cluster, or if the models themselves have been changed. Perhaps newer, improved models have been developed that provide better forecasting ability. The updated models may be saved at 835 for use by the forecaster system.

Figure 9:
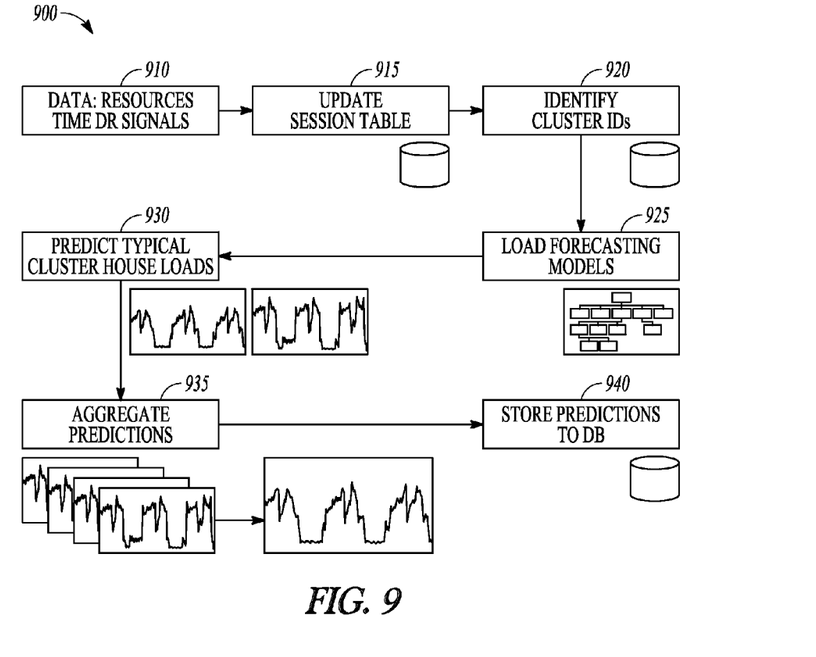
FIG. 9 is a block flow diagram illustrating forecaster prediction workflow according to an example embodiment.

FIG. 9 is a block flow diagram illustrating a method 900 of using a forecaster to predict energy consumption. Current data is shown as received at 910, and includes data from resources, a time, and DR signals that are proposed to be sent. A session table is updated at 915. The session table includes data during a current session with an operator who has selected one or more DR events to propagate to selected clusters. The cluster IDs are identified at 920 and the appropriate load forecasting models are loaded at 925 for the identified clusters. At 930, the models utilize the information in the session table 915 to predict typical cluster customer loads. These predictions are then aggregated at 935 based on the number of customers in each cluster and stored at 940. The operator may perform method 900 for a number of different scenarios and select a scenario that predicts energy consumption that meets the operator's goals.

In one example use case, a utility operator may desire to meet some load criterion such as peak load shaving. The operator needs to decide, to whom and when to send what DR signals. Using the energy load forecaster, the operator may run, either manually or automatically, a number of what-if scenarios, i.e. energy load forecasts given the DR signals and customer selection. From the results of the scenarios, the operator then can decide (also either manually or automatically), what is a good option and send the DR signals according to the decided option.

Figure 10:
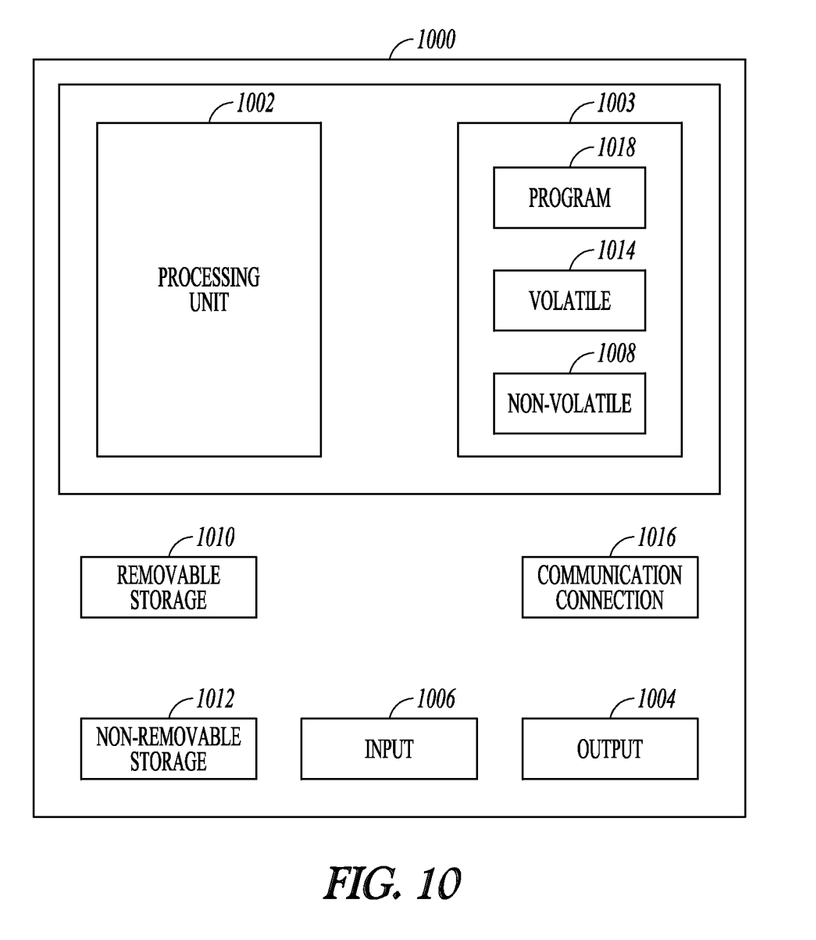
FIG. 10 is a block diagram of a computer system for use in implementing one or more methods and servers according to example embodiments.

FIG. 10 is a block schematic diagram of a computer system 1000 to implement a controller according to an example embodiment. In one embodiment, multiple such computer systems are utilized in a distributed network to implement multiple components in a transaction based environment. An object-oriented, service-oriented, or other architecture may be used to implement such functions and communicate between the multiple systems and components. One example computing device in the form of a computer 1000, may include a processing unit 1002, memory 1003, removable storage 1010, and non-removable storage 1012. Memory 1003 may include volatile memory 1014 and non-volatile memory 1008. Computer 1000 may include—or have access to a computing environment that includes—a variety of computer-readable media, such as volatile memory 1014 and non-volatile memory 1008, removable storage 1010 and non-removable storage 1012. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 1000 may include or have access to a computing environment that includes input 1006, output 1004, and a communication connection 1016. The computer may operate in a networked environment using a communication connection to connect to one or more remote computers, such as database servers. The remote computer may include a personal computer (PC), server, router, network PC, a peer device or other common network node, or the like. The communication connection may include a Local Area Network (LAN), a Wide Area Network (WAN) or other networks.

Computer-readable instructions stored on a computer-readable medium are executable by the processing unit 1002 of the computer 1000. A hard drive, CD-ROM, and RAM are some examples of articles including a non-transitory computer-readable medium. For example, a computer program 1018 capable of providing a generic technique to perform access control check for data access and/or for doing an operation on one of the servers in a component object model (COM) based system may be included on a CD-ROM and loaded from the CD-ROM to a hard drive. The computer-readable instructions allow computer 1000 to provide generic access controls in a COM based computer network system having multiple users and servers.

Examples:

1. A method comprising:
   obtaining energy consumption information representative of energy consumption behaviors of multiple customers;
   grouping the multiple customers into multiple different clusters based on the consumption behaviors of the multiple customers; and
   generating an energy consumption model for each different cluster to enable forecasting of energy demand of the multiple customers.

2. The method of example 1 wherein the energy consumption information includes a percentage of times a customer opts out from a demand response (DR) event.

3. The method of any of examples 1-2 wherein the energy consumption information includes historical thermostat telemetry for a customer.

4. The method of any of examples 1-3 wherein the energy consumption information includes weather information data analysis for a customer.

5. The method of any of examples 1-4 wherein the energy consumption information includes a sum of electric heating/cooling status throughout a typical day of a customer.

6. The method of any of examples 1-5 wherein the energy consumption information includes geographical location.

7. The method of any of examples 1-6 wherein each customer is assigned a customer id, and each cluster is assigned a cluster id, and wherein each customer id is mapped to a cluster id.

8. The method of example 7 and further comprising:
   obtaining a load modification criterion;
   using an energy forecaster to run simulations of the effect of DR signals on customers selected from different clusters; and
   sending DR signals to customers based on the simulations.

9. The method of any of examples 1-8 and further comprising:
   predicting a response for a typical customer in each of multiple clusters based on the model for each cluster; and
   aggregating the responses to determine overall consumption of the multiple clusters.

10. A method comprising:
    forming multiple clusters of energy utilizing customers based on the customer behavior;
    identifying a model for each of the multiple clusters that predicts energy utilization of a typical customer in each of the multiple clusters responsive to a demand response event; and
    using the clusters and models to generate and simulate multiple scenarios of issuing demand response events and predict energy utilization for each scenarios in order to find a scenario that meets a desired energy load modification criteria.

11. The method of example 10 wherein the energy consumption information includes a percentage of times a customer opts out from a demand response (DR) event.

12. The method of any of examples 10-11 wherein the energy consumption information includes historical thermostat telemetry for a customer.

13. The method of any of examples 10-12 wherein the energy consumption information includes weather information data analysis for a customer.

14. The method of any of examples 10-13 wherein the energy consumption information includes a sum of electric heating/cooling status throughout a typical day of a customer.

15. The method of any of examples 10-14 wherein the energy consumption information includes geographical location.

16. The method of any of examples 10-15 wherein each customer is assigned a customer id, and each cluster is assigned a cluster id, and wherein each customer id is mapped to a cluster id.

17. A device comprising:
    a processor;
    a memory device coupled to the processor and having a program stored thereon for execution by the processor to:
    obtain energy consumption information representative of energy consumption behaviors of multiple customers;
    group the multiple customers into multiple different clusters based on the consumption behaviors of the multiple customers; and
    generate an energy consumption model for each different cluster to enable forecasting of energy demand of the multiple customers.

18. The device of example 17 wherein the energy consumption information includes a percentage of times a customer opts out from a demand response (DR) event, and wherein the energy consumption information includes historical thermostat telemetry for a customer.

19. The device of any of examples 17-18 wherein the program is further executed on the processor to:
    obtain a load modification criterion;
    use an energy forecaster to run simulations of the effect of DR signals on customers selected from different clusters; and
    send DR signals to customers based on the simulations.

20. The device of any of examples 17-19 wherein the program is further executed on the processor to:
    predict a response for a typical customer in each of multiple clusters based on the model for each cluster; and
    aggregate the responses to determine overall consumption of the multiple clusters.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A method comprising:
   obtaining energy consumption information representative of energy consumption behaviors of multiple customers, the energy consumption information including past weather information of respective geographical regions corresponding to each of the multiple customers and energy usage of the multiple customers including a number of energy consumption peaks and time frames for each of the energy consumption peaks for each of the multiple customers;
   grouping the multiple customers into multiple different clusters based on the energy consumption behaviors of the multiple customers including grouping customers with a same number of energy consumption peaks in same respective time periods in a same cluster of the multiple different clusters;

obtaining predicted future weather information for the respective geographical regions;

aggregating the predicted future weather information to reduce an amount of weather information and unify the weather information to a specified sampling frequency;

generating an energy consumption model for each different cluster of the multiple different clusters to enable forecasting of energy demand of the multiple customers, the energy consumption model generated based on the predicted future weather information for the customers in the cluster and the energy consumption behavior of the multiple customers for each different cluster of the multiple different clusters;

estimating energy consumption for one customer in each of the clusters of the multiple different clusters using the respective energy consumption models;

multiplying each estimated energy consumption by a number of customers in a corresponding cluster of the multiple different clusters to determine a total estimated energy consumption;

obtaining a load modification criterion;

simulating, using an energy forecaster, an effect of demand response (DR) signals on customers selected from different clusters of the multiple different clusters, the energy forecaster using the generated energy consumption model associated with the cluster of each selected customer; and sending DR signals to the selected customers at selected times based on the simulations associated with each cluster of the multiple different clusters in order to meet the load modification criterion, wherein energy consumption behaviors of at least some of the selected customers at selected times are changed in response to the sent DR signals.

2. The method of claim 1 wherein the energy consumption information includes a percentage of times a customer opts out from a DR event.

3. The method of claim 1 wherein the energy consumption information includes historical thermostat telemetry for a customer.

4. The method of claim 1 wherein the energy consumption information includes weather information data analysis for a customer.

5. The method of claim 1 wherein the energy consumption information includes a sum of electric heating/cooling status throughout a typical day of a customer.

6. The method of claim 1 wherein the energy consumption information includes geograghical location.

7. The method of claim 1 wherein each customer is assigned a customer id, and each cluster of the multiple different clusters is assigned a cluster id, and wherein each customer id is mapped to a cluster id.

8. The method of claim 1 and further comprising:
predicting a response for a typical customer in each of the multiple different clusters based on the energy consumption model for each cluster of the multiple different clusters; and
aggregating the responses to determine overall consumption of the multiple different clusters.

9. A device comprising:
a processor;
a memory device coupled to the processor and having a program stored thereon for execution by the processor to:

obtain energy consumption information representative of energy consumption behaviors of multiple customers, the energy consumption information including past weather information of respective geographical regions corresponding to each of the multiple customers and energy usage of the multiple customers including a number of energy consumption peaks and time frames for each of the energy consumption peaks for each of the multiple customers;

group the multiple customers into multiple different clusters based on the energy consumption behaviors of the multiple customers including grouping customers with a same number of energy consumption peaks in a same time period in a same cluster of the multiple different clusters;

obtain predicted future weather information for the respective geographical regions;

aggregate the predicted future weather information to reduce an amount of weather information and unify the weather information to a specified sampling frequency;

generate an energy consumption model for each different cluster of the multiple different clusters to enable forecasting of energy demand of the multiple customers, the energy consumption model generated based on the predicted future weather information for the customers in the cluster and the energy consumption behavior of the multiple customers for each different cluster of the multiple different clusters;

estimate energy consumption for one customer in each of the clusters of the multiple different clusters using the respective energy consumption models;

multiply each estimated energy consumption by a number of customers in a corresponding cluster of the multiple different clusters to determine a total estimated energy consumption;

obtain a load modification criterion;

simulate, using an energy forecaster, an effect of demand response (DR) signals on customers selected from different clusters of the multiple different clusters, the energy forecaster using the generated energy consumption model associated with the cluster of each selected customer; and send DR signals to the selected customers at selected times based on the simulations associated with each cluster of the multiple different clusters in order to meet the load modification criterion, wherein energy consumption behaviors of at least some of the selected customers at selected times are changed in response to the sent DR signals.

10. The device of claim 9 wherein the energy consumption information includes a percentage of times a customer opts out from a DR event, and wherein the energy consumption information includes historical thermostat telemetry for a customer.

11. The device of claim 9 wherein the program is further executed on the processor to:
predict a response for a typical customer in each of the multiple different clusters based on the energy consumption model for each cluster of the multiple different clusters; and
aggregate the responses to determine overall energy consumption of the multiple different clusters.

12. At least one non-transitory computer-readable medium the non-transitory computer-readable medium including instructions, which when performed by a computer, cause the computer to performs operations for load forecasting and response, the operations comprising:

obtaining energy consumption information representative of energy consumption behaviors of multiple customers, the energy consumption information including past weather information of respective geographical regions corresponding to each of the multiple customers and energy usage of the multiple customers including a number of energy consumption peaks and time frames for each of the energy consumption peaks for each of the multiple customers;

grouping the multiple customers into multiple different clusters based on the energy consumption behaviors of the multiple customers including grouping customers with a same number of energy consumption peaks in a same respective time period in a same cluster of the multiple different clusters;

obtaining predicted future weather information for the respective geographical regions;

aggregating the predicted future weather information to reduce an amount of weather information and unify the weather information to a specified sampling frequency;

generating an energy consumption model for each different cluster of the multiple different clusters to enable forecasting of energy demand of the multiple customers, the energy consumption model generated based on the predicted future weather information for the customers in the cluster and the energy consumption behavior of the multiple customers for each different cluster of the multiple different clusters;

estimating energy consumption for one customer in each of the clusters of the multiple different clusters using the respective energy consumption models;

multiplying each estimated energy consumption by a number of customers in a corresponding cluster of the multiple different clusters to determine a total energy consumption;

obtaining a load modification criterion;

simulating, using an energy forecaster, an effect of demand response (DR) signals on customers selected from different clusters of the multiple different clusters of the multiple different clusters, the energy forecaster using the generated energy consumption model associated with the cluster of each selected customer; and sending DR signals to the selected customers at selected times based on the simulations associated with each cluster of the multiple different clusters in order to meet the load modification criterion, wherein energy consumption behaviors of at least some of the selected customers at selected times are changed in response to the sent DR signals.

13. The computer-readable medium of claim 1 wherein the energy consumption information includes a percentage of times a customer opts out from a DR event.

14. The computer-readable medium of claim 1 wherein the energy consumption information includes historical thermostat telemetry for a customer.

15. The computer-readable medium of claim 1 wherein the energy consumption information includes weather information data analysis for a customer.

16. The computer-readable medium of claim 1 wherein the energy consumption information includes a sum of electric heating/cooling status throughout a typical day of a customer.

17. The computer-readable medium of claim 1 wherein the energy consumption information includes geographical location.

18. The computer-readable medium of claim 1 wherein each customer is assigned a customer id, and each cluster of the multiple different clusters is assigned a cluster id, and wherein each customer id is mapped to a cluster id.

* * * * *